United States Patent Office.

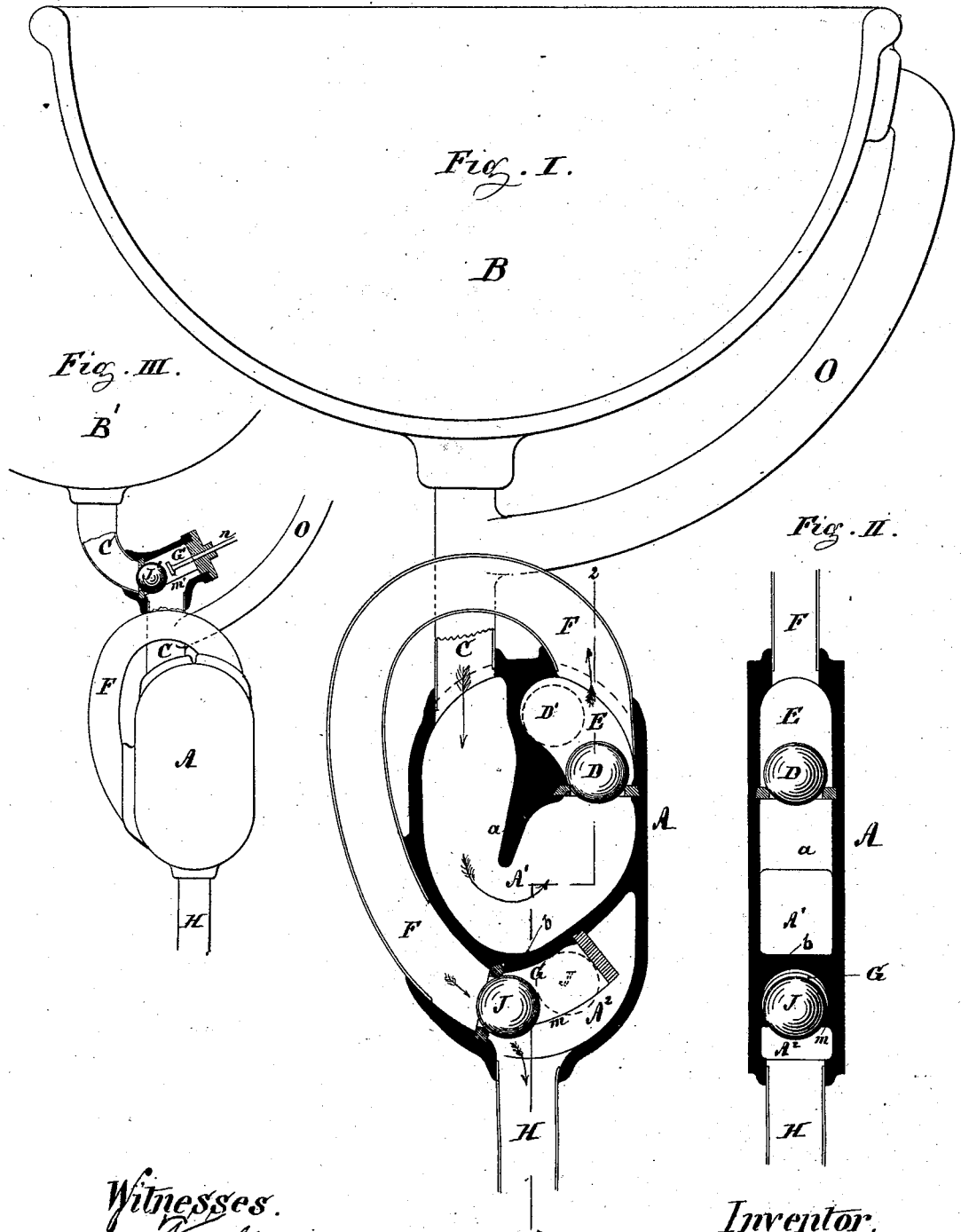

CHARLES HALSTEAD, OF NEW YORK, N. Y.

STENCH-TRAP.

SPECIFICATION forming part of Letters Patent No. 289,831, dated December 11, 1883.

Application filed April 11, 1881. Renewed May 11, 1883. (No model.)

*To all whom it may concern:*

Be it known that I, CHARLES HALSTEAD, a citizen of the United States, residing at New York, in the State of New York, have invented a new and Improved Sewer and Stench Trap, of which the following is a specification.

This invention is an improvement of the sewer and stench trap for which Letters Patent of the United States No. 237,383, dated February 8, 1880, have been granted to me; and it consists of a trap easily connected into the pipes at the under side of a wash-bowl, water-closet, or sink as at present in common use.

In the accompanying drawings, Figure I represents a section of my improved stench-trap attached to a wash-basin. Fig. II is a cross-section of the same at line 2 3, Fig. I. Fig. III shows the arrangement of the stench-trap to a water-closet, partly in section.

Similar letters represent similar parts in all the figures.

A is the stench-trap; B, the wash-basin; C, the pipe to connect the top of the trap with the bottom of the wash-basin; O, the overflow-pipe from the wash-basin, connected to the pipe C. H is the waste-pipe leading from the trap A to the sewer.

The trap A is divided, through a division-plate, $b$, into two parts—a large upper chamber, A′, and a lower chamber, A². A central division-plate, $a$, extending only about two-thirds downward in the chamber A′, divides this chamber in the upper part into two. To one of these parts the pipe C is connected, and the other side of said chamber is connected through a pipe, F, with the lower chamber, A².

In the side of the chamber A′, close to the mouth of the pipe F, a ball-valve, D, is arranged, and the end of said pipe F in the chamber A² is likewise closed by a ball-valve, J.

Above the valve D, a cavity, E, running diagonally sidewise, is arranged for the purpose of guiding said valve D, after the same is lifted off from its seat sidewise and clear of the mouth of the pipe F, into a position, as shown in dotted line at D′. By this arrangement an uninterrupted current can pass directly from the chamber into the pipe F, carrying all larger particles without obstruction away with it. The valve J is guided in a similar diagonal sidewise-running cavity, G, guiding the valve J, when removed from its seat sidewise, as indicated by dotted lines, away and clear of the mouth of the pipe H, so as not to offer any obstruction to the full stream from the pipe F into the pipe H. These guiding-channels E and G, besides being arranged sidewise, have likewise a diagonal upward direction, to cause the ball-valves D and J to return to their seats as soon as the flow of water stops by their weight or gravity. The guiding-channel G is open at its under side, $m$, to allow the necessary passage for the fluid, and incloses and guides the valve J only in about three-fourths of its circumference. The pipe F, it will be perceived, acts as a siphon to draw the fluid from the upper chamber, A′, into the lower chamber, and discharges into the waste-pipe H.

When the trap is not operating, we have three places where the same will be sealed against any escape of gases which may arise through the pipe H from the sewer or otherwise—namely, the valves J and D, and the water remaining in the bottom of the chamber A′, which will always be closed by the projecting partition $a$.

When a stench-trap is attached to a water-closet basin, it is desirable to allow a quantity of water to flow into the basin, and to be retained there before being allowed to escape. For this purpose a valve, J′, as shown in Fig. III, may be arranged in the pipe C, acted upon through the rod $n$, so as to retain said valve J for some time in its seat against the pressure or weight of the fluid and matter in the basin B, this rod $n$ being connected to the gearing or levers which operate the water-supply for the basin. This valve J is guided in a similarly constructed diagonal upward and sidewise channel, G′.

What I claim as my invention, and desire to secure by Letters Patent, is—

A stench-trap consisting of two chambers, A′ and A², with a downward-projecting division-plate, $a$, in the upper chamber, A′, the siphon-pipe F, and valves D and J, in combination with the pipe C, connected with the water-basin, and the discharge-pipe H, constructed and arranged to operate in the manner and for the purpose substantially as described.

CHARLES HALSTEAD.

Witnesses:
HENRY E. ROEDER,
J. B. NONES.